United States Patent
Kinasz

(10) Patent No.: US 10,546,155 B2
(45) Date of Patent: Jan. 28, 2020

(54) PROTECTING AN ITEM OF SOFTWARE

(71) Applicant: IRDETO B.V., Hoofddorp (NL)

(72) Inventor: Michel Kinasz, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 231 days.

(21) Appl. No.: 15/300,553

(22) PCT Filed: Mar. 31, 2014

(86) PCT No.: PCT/EP2014/056416
§ 371 (c)(1),
(2) Date: Sep. 29, 2016

(87) PCT Pub. No.: WO2015/149826
PCT Pub. Date: Oct. 8, 2015

(65) Prior Publication Data
US 2017/0109539 A1  Apr. 20, 2017

(51) Int. Cl.
*G06F 17/30* (2006.01)
*G06F 21/62* (2013.01)

(52) U.S. Cl.
CPC .................. *G06F 21/629* (2013.01)

(58) Field of Classification Search
CPC ........ G06F 21/629; G06F 21/14; G06F 21/10; G06F 21/125; G06F 12/1408; G06F 21/60; H04L 2209/16; H04L 9/00; H04L 9/3093; H04L 9/002; H04L 9/0618
See application file for complete search history.

(56) References Cited

U.S. PATENT DOCUMENTS

| | | | | |
|---|---|---|---|---|
| 6,081,597 A * | 6/2000 | Hoffstein | .............. | H04L 9/3093 380/28 |
| 6,594,761 B1 * | 7/2003 | Chow | ..................... | G06F 21/14 713/189 |
| 6,779,114 B1 * | 8/2004 | Chow | ..................... | G06F 21/14 713/189 |
| 6,842,862 B2 | 1/2005 | Chow et al. | | |

(Continued)

FOREIGN PATENT DOCUMENTS

| | | |
|---|---|---|
| CN | 103516767 A | 1/2014 |
| EP | 2 227 014 A2 | 8/2010 |

(Continued)

OTHER PUBLICATIONS

International Search Report and Written Opinion cited in corresponding International Application No. PCT/EP2014/056416 dated Dec. 2, 2014.

(Continued)

*Primary Examiner* — Jason K Gee
*Assistant Examiner* — Lizbeth Torres-Diaz
(74) *Attorney, Agent, or Firm* — Rimon PC, Marc Kaufman

(57) ABSTRACT

A method of protecting an item of software, said item of software arranged to perform data processing based on one or more items of data, the method comprising: applying one or more software protection techniques to said item of software to generate a protected item of software, wherein said one or more software protection techniques are arranged so that said protected item of software implements said data processing at least in part as one or more linear algebra operations over a finite ring.

12 Claims, 2 Drawing Sheets

(56) References Cited

U.S. PATENT DOCUMENTS

| | | | |
|---|---|---|---|
| 7,350,085 | B2 | 3/2008 | Johnson et al. |
| 7,395,433 | B2 | 7/2008 | Chow et al. |
| 7,397,916 | B2 * | 7/2008 | Johnson .................. G06F 21/14 380/28 |
| 7,809,135 | B2 | 10/2010 | Johnson et al. |
| 9,906,360 | B2 * | 2/2018 | Johnson .................. G06F 21/14 |
| 2003/0163718 | A1 | 8/2003 | Johnson et al. |
| 2003/0221121 | A1 | 11/2003 | Chow et al. |
| 2004/0139340 | A1 * | 7/2004 | Johnson .................. G06F 21/14 713/194 |
| 2005/0021966 | A1 | 1/2005 | Chow et al. |
| 2010/0246822 | A1 | 9/2010 | Eisen et al. |
| 2013/0346962 | A1 * | 12/2013 | Fang ................... H04L 67/1095 717/175 |
| 2014/0169556 | A1 * | 6/2014 | Yagisawa .............. H04L 9/3066 380/30 |
| 2017/0109539 | A1 * | 4/2017 | Kinasz ...................... H04L 9/00 |

FOREIGN PATENT DOCUMENTS

| | | | | |
|---|---|---|---|---|
| WO | WO-2008101341 | A1 * | 8/2008 | ............. G06F 21/14 |
| WO | 2009140774 | A1 | 11/2009 | |
| WO | 2011120123 | A1 | 10/2011 | |
| WO | 2012126077 | A1 | 9/2012 | |

OTHER PUBLICATIONS

James A Muir: "A Turtorial on White-Box AES", International Association for Cryptologic Research, vol. 20130228:053134, Feb. 28, 2013, pp. 1-25, XP061007352, retrieved on Feb. 28, 2013.

S. Chow et al., "A White-Box DES Implementation for DRM Applications", Cloakware Corporation, Ottawa, Canada.

S. Chow et al, "White-Box Cryptography and an AES Implementation", Cloakware Corporation, Ottawa, Canada.

Chinese First Office Action received for Chinese Application Serial No. 201480079424.X dated Dec. 18, 2018, 11 pages.

* cited by examiner

PROTECTING AN ITEM OF SOFTWARE

The present application is the United States national stage of International Application No. PCT/EP2014/056416, filed Mar. 31, 2014, the entire contents of which are incorporated herein by reference.

FIELD OF THE INVENTION

The present invention relates to methods for protecting an item of software and methods for performing data processing using a protected item of software, and apparatus and computer programs for carrying out such methods.

BACKGROUND OF THE INVENTION

It is well-known that attacks are often launched against items of software. The attacker may wish to obtain secret information contained within the item of software (such as a cryptographic key), with the aim of misusing that secret information (for example by distributing the cryptographic key to other people/systems so that those people/systems can use the cryptographic key in an unauthorized manner). Similarly, the attacker may wish to modify the execution flow of an item of software. For example, the item of software may have a decision point that checks whether a user of the item of software has certain permissions or access rights—if the user has those permissions or access rights then the item of software may grant the user access to certain functionality or data, otherwise such access is denied. The attacker may wish to try to modify the execution of the item of software at this decision point so that, even if the user does not have the permissions or access rights, the item of software still grants the user access to that certain functionality or data.

There are numerous well-known software protection techniques that can be applied to an initial item of software in order to generate a protected item of software, with the aim of making it impossible (or at least sufficiently difficult) for an attacker to be successful in his attacks.

SUMMARY OF THE INVENTION

Ensuring that the software protection techniques can be applied efficiently, in a secure and upgradable manner, and in a way in which security auditing can be carried out easily and efficiently, is a difficult challenge. Embodiments of the invention aim to address such issues.

According to a first aspect of the invention, there is provided a method of protecting an item of software, said item of software arranged to perform data processing based on one or more items of data, the method comprising: applying one or more software protection techniques to said item of software to generate a protected item of software, wherein said one or more software protection techniques are arranged so that said protected item of software implements said data processing at least in part as one or more linear algebra operations over a finite ring.

In some embodiments, each of said one or more linear algebra operations is a respective linear algebra operation for a vector space over said finite ring, and wherein each of said one or more linear algebra operations operates on respective input data represented as one or more elements of said vector space to produce respective output data. For at least one of said one or more linear algebra operations, said respective input data may be based, at least in part, on at least one of said one or more items of data. The finite ring is may be a ring $F=\{\mathbb{N}/2^n\mathbb{N}\}$ and said vector space may then be a vector space $V=F^n$, wherein n is a positive integer.

In some embodiments, said data processing comprises an arithmetic operation over the finite ring, and said applying said one or more software protection techniques to said item of software comprises implementing said arithmetic operation in said protected item of software using one or more linear algebra operations over said finite ring.

In some embodiments, said data processing comprises a logic operation over the finite ring, and said applying said one or more software protection techniques to said item of software comprises implementing said logic operation in said protected item of software using one or more linear algebra operations over said finite ring.

In some embodiments, said data processing comprises at least one of: (a) a decision based, at least in part, on at least one of said one or more items of data; (b) a security-related function; (c) an access-control function; (d) a cryptographic function; and (e) a rights-management function.

In some embodiments, said one or more software protection techniques comprise one or more of: (i) white-box protection techniques; (ii) node-locking techniques; (iii) data flow obfuscation; and (iv) control flow obfuscation.

According to a second aspect of the invention, there is provided a method of performing data processing on one or more items of data, wherein said data processing comprises at least one of: (a) a decision based, at least in part, on at least one of said one or more items of data; (b) a security-related function; (c) an access-control function; (d) a cryptographic function; and (e) a rights-management function; wherein the method comprises: executing a protected item of software that implements said data processing at least in part as one or more linear algebra operations over a finite ring.

In some embodiments, each of said one or more linear algebra operations is a respective linear algebra operation for a vector space over said finite ring, and each of said one or more linear algebra operations operates on respective input data represented as one or more elements of said vector space to produce respective output data. For at least one of said one or more linear algebra operations, said respective input data may be based, at least in part, on at least one of said one or more items of data. The finite ring may be a ring $F=\{\mathbb{N}/2^n\mathbb{N}\}$ and the vector space may be a vector space $V=F^n$, wherein n is a positive integer.

In some embodiments, said data processing comprises an arithmetic operation over the finite ring, and said protected item of software implements said arithmetic operation using one or more linear algebra operations over said finite ring.

In some embodiments, said data processing comprises a logic operation over the finite ring, and said protected item of software implements said logic operation using one or more linear algebra operations over said finite ring.

According to a third aspect of the invention, there is provided an apparatus arranged to carry out any one of the above-mentioned methods.

According to a fourth aspect of the invention, there is provided a computer program which, when executed by a processor, causes the processor to carry out any one of the above-mentioned methods. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
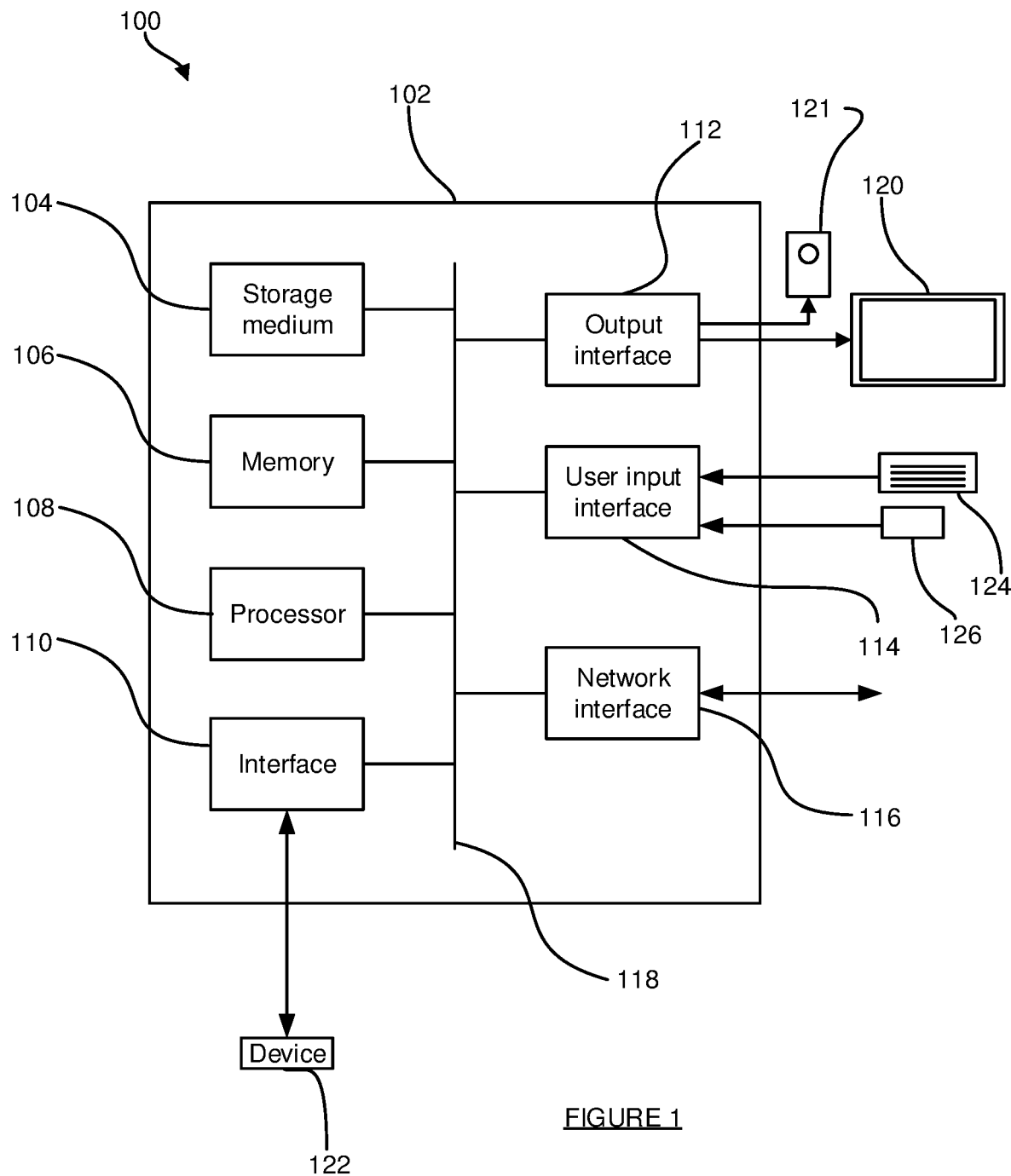
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
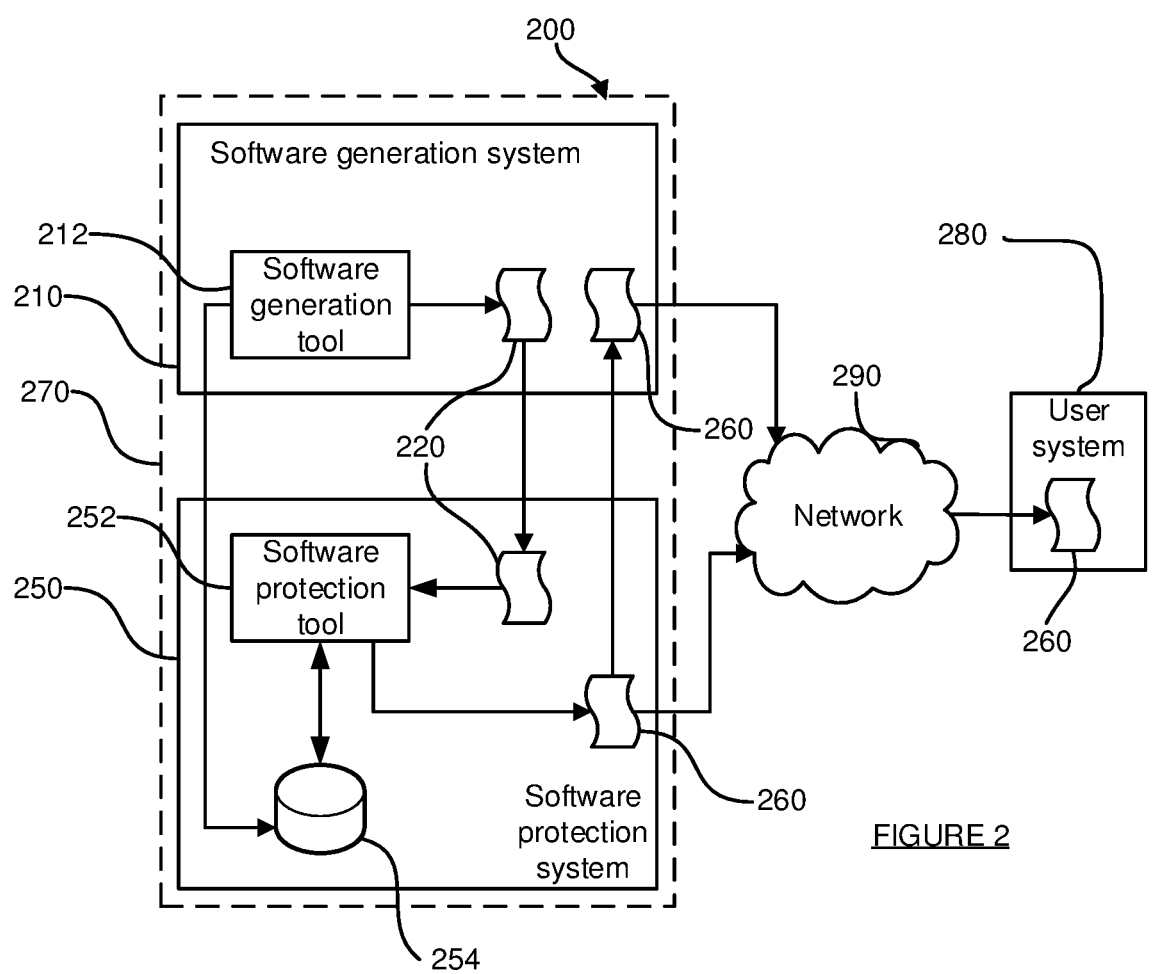
FIG. 2 schematically illustrates a system according to an embodiment of the invention.

FIG. 2 schematically illustrates a system 200 according to an embodiment of the invention. The system 200 comprises: a software generation system 210; a software protection system 250; a user system 280; and a network 290.

The software generation system 210 comprises (or executes or uses) a software generation tool 212 that generates an initial item of software 220. The software generation tool 212 may be, for example, a software application that a processor of the software generation system 210 executes. The software generation system 210 may be arranged to generate the initial item of software 220 autonomously; additionally or alternatively, the software generation system 210 may be arranged to generate the initial item of software 220 under the control of one or more software developers who write, at least in part, software code that forms part of the initial item of software 220. Tools for generating or developing an item of software are very well-known and shall, therefore, not be described in more detail herein.

The initial item of software 220 may comprise one or more of source code, object code, executable code and binary code. The initial item of software 220 may be programmed or written in one or more programming languages, which may comprise compiled programming languages and/or interpreted or scripted programming languages. The initial item of software 220 may comprise one or more modules or software components or computer programs, which may be presented or stored within one or more files. Indeed, the initial item of software 220 may be an entire software application, a software library, or the whole or a part of one or more software functions or procedures, or anywhere in-between (as will be appreciated by the person skilled in the art).

The initial item of software 220, when executed by a processor, is arranged to perform (or to cause the processor to perform) data processing based on one or more items of data. Each item of data could, respectively, be any type of data, such as audio data, video data, multimedia data, text data, financial data, one or more cryptographic keys, digital rights management data, conditional access data, etc. The data processing may comprise one or more of: (a) a decision based, at least in part, on at least one of the one or more items of data; (b) a security-related function; (c) an access-control function; (d) a cryptographic function; and (e) a rights-management function. However, it will be appreciated that the data processing may comprise one or more other types of functions or operations in addition to, or as an alternative to, the above examples. As one example, the data processing may relate to providing a user access to content (such as audio and/or video data) that is received and/or stored as encrypted content, where the user is provided access to the content only if the user has appropriate access permissions/rights. The one or more items of data may, therefore, comprise: the encrypted content; details about, or an identification of, the user and/or the user system 280; data specifying one or more permissions and/or rights; and one or more cryptographic keys (which could be stored as part of the initial item of software 220). Consequently, it is desirable to protect the initial item of software 220, so that an attacker cannot use the initial item of software 220 in an unauthorized manner to thereby gain access to the content even if the attacker is not authorised to access the content, i.e. to prevent the attacker bypassing the conditional access and/or digital rights management functionality provided by the initial item of software 220 (for example, by determining one or more decryption keys, or circumventing a decision point or branch point in the initial item of software 220 that relates to whether or not a user should be provided access to the content). It will be appreciated that there is, of course, other functionality that the initial item of software 220 could perform and/or other information that the initial item of software 220 uses for which it would (for similar or perhaps alternative reasons) be desirable to protect against an attacker. Consequently, as shown in FIG. 2, the initial item of software 220 is provided (or transferred or communicated) to the software protection system 250.

The software protection system 250 comprises (or executes or uses) a software protection tool 252. The software protection tool 252 may be, for example, a software application that a processor of the software protection system 250 executes. The software protection tool 252 is arranged to receive, as an input, the initial item of software 220. The software protection tool 252 generates a protected item of software 260 based on the received initial item of software 220. Methods by which the software protection tool 252 generates the protected item of software 260 shall be described later.

The software protection system 250 may comprise a software database 254. The software database 254 comprises one or more portions of software which may be used by the software protection tool 252 when generating the protected item of software 260—this shall be described in more detail later.

The software generation system 210 and the software protection system 250 may be run or operated by different entities. Thus, as shown in FIG. 2, the software protection system 250 may output the protected item of software 260 to the software generation system 210. With this model, the software protection system 250 provides a protection service to the software generation system 210. Alternatively, the software generation system 210 and the software protection system 250 may be run or operated by the same entity—indeed, the software generation system 210 and the software protection system 250 may form part of a single system (illustrated in FIG. 2 by the dashed line 270) that uses the software generation tool 212 to generate an initial item of software 220 and that uses the software protection tool 252 to protect that initial item of software 220 by generating a protected item of software 260.

Thus, the software generation system 210 and/or the software protection system 250 may output (or provide or communicate) the protected item of software 260 to the user system 280 via the network 290. It will be appreciated, however, that distribution of the protected item of software 260 may be performed by a different entity not shown in FIG. 2.

It will also be appreciated that the protected item of software 260 may undergo various additional processing after the protected item of software 260 has been generated by the software protection system 250 and before distribution to the user system 280. It will, therefore, be appreciated that in the follow description, references to distribution or use of the protected item of software 260 include distribution or use of the piece of software that results from applying the additional processing to the protected item of software 260. For example, the protected item of software 260 may need to be compiled and/or linked with other items of software (for instance if the protected item of software 260 is to form part of a larger software application that is to be distributed to the user system 280). However, it will be appreciated that such additional processing may not be required (for example if the protected item of software 260 is a final piece of JavaScript ready for distribution).

The network 290 may be any kind of data communication network suitable for communicating or transferring the protected item of software 260 to the user system 280. Thus, the network 290 may comprise one or more of: a local area network, a wide area network, a metropolitan area network, the Internet, a wireless communication network, a wired or cable communication network, a satellite communications network, a telephone network, etc. The software generation system 210 and/or the software protection system 250 may be arranged to communicate with the user system 280 via the network 290 via any suitable data communication protocol. Indeed, the protected item of software 260 may be provided to the user system 280 via a physical medium (such as being stored on one or more CDs or DVDs), so that the network 290 may then comprise a delivery system for physically delivering the physical medium to the user system 280.

The user system 280 is arranged to use the protected item of software 260, for example by executing the protected item of software 280 on one or more processors of the user system 280.

The user system 280 may be any system suitable for executing the protected item of software 280. Thus, the user system 280 may be one or more of: a personal computer, a laptop, a notepad, a tablet computer, a mobile telephone, a set top box, a television, a server, a games console, etc. The software protection system 250 and the software generation system 210 may, for example, comprise one or more personal computers and/or server computers. Thus, each of the user system 280, the software protection system 250 and the software generation system 210 may comprise one or more respective systems 100 as described above with reference to FIG. 1.

It will be appreciated that, whilst FIG. 2 illustrates the system 200 as comprising a single user device 280, a single software generation system 210, and a single software protection system 250, the system 200 may comprise multiple user devices 280 and/or multiple software generation systems 210 and/or multiple software protection systems 250.

2—Software Protection Techniques

As mentioned above, the aim of the software protection tool 252 is to protect the functionality or data processing of the initial item of software 220 and/or to protect data used or processed by the initial item of software 220. In particular, the protected item of software 260 will provide the same functionality or data processing as the initial item of software 220—however, this functionality or data processing is implemented in the protected item of software 260 in a manner such that an operator of the user system 280 cannot access or use this functionality or data processing from the protected item of software 260 in an unintended or unauthorized manner (whereas if the user system 280 were provided with the initial item of software 220, then the operator of the user system 280 might have been able to access or use the functionality or data processing in an unintended or unauthorized manner). Similarly, the protected item of software 260 may store secret information (such as a cryptographic key) in a protected or obfuscated manner to thereby make it more difficult (if not impossible) for an attacker to deduce or access that secret information (whereas if the user system 280 were provided with the initial item of software 220, then the operator of the user system 280 might have been able to deduce or access that secret information from the initial item of software 220).

For example:

The initial item of software 220 may comprise a decision (or a decision block or a branch point) that is based, at least in part, on at least one of the one or more items of data to be processed by the initial item of software 220. If the initial item of software 220 were provided to the user system 280, then an attacker may be able to force the initial item of software 220 to execute so that a path of execution is followed after processing the decision even though that path of execution were not meant to have been followed. For example, the decision may comprise testing whether a program variable B is TRUE of FALSE, and the initial item of software 220 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger) force the initial item of software 220 to follow path $P_F$ if the decision identified that B is TRUE and/or force the initial item of software 220 to follow path $P_T$ if the decision identified that B is FALSE. Therefore, in some embodiments, the software protection tool 250 aims to prevent (or at least make it more difficult) for the attacker to do this by applying one or more software protection techniques to the decision within the initial item of software 220 when generating the protected item of software 260.

The initial item of software 220 may comprise one or more of a security-related function; an access-control function; a cryptographic function; and a rights-management function. Such functions often involve the use of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, the software protection tool 250 aims to prevent (or at least make it more difficult) for the attacker to identify or determine the one or more pieces of secret data by applying one or more software protection techniques to such functions within the initial item of software 220 when generating the protected item of software 260.

A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker. Similarly, it would be desirable to prevent the attacker from modifying the execution/control flow of the item of software, for example preventing the attacker forcing the item of software to take one execution path after a decision block instead of a legitimate execution path. There are numerous techniques, referred to herein as "white-box obfuscation techniques", for transforming the initial item of software 220 into the protected item of software 260 so that the protected item of software 260 is resistant to white-box attacks, i.e. so that the protected item of software 260, when executing in a white-box environment, is resistant to attacks (such as the ones mentioned above) by an attacker. Examples of such white-box obfuscation techniques can be found, in "White-Box Cryptography and an AES Implementation", S. Chow et al, Selected Areas in Cryptography, $9^{th}$ Annual International Workshop, SAC 2002, Lecture Notes in Computer Science 2595 (2003), p250-270 and "A White-box DES Implementation for DRM Applications", S. Chow et al, Digital Rights Management, ACM CCS-9 Workshop, DRM 2002, Lecture Notes in Computer Science 2696 (2003), p1-15, the entire disclosures of which are incorporated herein by reference. Additional examples can be found in US61/055,694 and WO2009/140774, the entire disclosures of which are incorporated herein by reference. Some white-box obfuscation techniques implement data flow obfuscation—see, for example, U.S. Pat. Nos. 7,350,085, 7,397,916, 6,594,761 and 6,842,862, the entire disclosures of which are incorporated herein by reference. Some white-box obfuscation techniques implement control flow obfuscation—see, for example, U.S. Pat. Nos. 6,779,114, 6,594,761 and 6,842,862 the entire disclosures of which are incorporated herein by reference. However, it will be appreciated that other white-box obfuscation techniques exist and that embodiments of the invention may use any white-box obfuscation techniques.

As another example, it is possible that the initial item of software 220 may be intended to be provided (or distributed) to, and used by, a particular user device 280 (or a particular set of user devices 280) and that it is, therefore, desirable to "lock" the item of software 220 to the particular user device(s) 280, i.e. to prevent the item of software 220 from executing on another user device 280. Consequently, there are numerous techniques, referred to herein as "node-locking" techniques, for transforming the initial item of software 220 into the protected item of software 260 so that the protected item of software 260 can execute on (or be executed by) one or more predetermined/specific user devices 280 but will not execute on other user devices. Examples of such node-locking techniques can be found in WO2012/126077, the entire disclosure of which is incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorized copies of the digital object. Digital watermarking can be applied to items of software. Examples of such software watermarking techniques can be found in U.S. Pat. No. 7,395,433, the entire disclosure of which is incorporated herein by reference. However, it will be appreciated that other software watermarking techniques exist and that embodiments of the invention may use any software watermarking techniques.

It may be desirable to provide different versions of the protected item of software 260 to different user systems 280. The different versions of the protected item of software 260 provide the different user systems 280 with the same functionality—however, the different versions of the protected item of software 260 are programmed or implemented differently. This helps limit the impact of an attacker successfully attacking the protected item of software 260. In particular, if an attacker successfully attacks his version of the protected item of software 260, then that attack (or data, such as cryptographic keys, discovered or accessed by that attack) may not be suitable for use with different versions of the protected item of software 260. Consequently, there are numerous techniques, referred to herein as "diversity" techniques, for transforming the initial item of software 220 into the protected item of software 260 so that different versions of the protected item of software 260 are generated (i.e. so that "diversity" is introduced). Examples of such diversity techniques can be found in WO2011/120123, the entire disclosure of which is incorporated herein by reference. However, it will be appreciated that other diversity techniques exist and that embodiments of the invention may use any diversity techniques.

The above-mentioned white-box obfuscation techniques, node-locking techniques, software watermarking techniques and diversity techniques are examples of software protection techniques. It will be appreciated that there are other methods of applying protection to an initial item of software 220 to generate a protected item of software 260. Thus, the term "software protection techniques" as used herein shall be taken to mean any method of applying protection to an initial item of software 220 to generate a protected item of software 260 (with the aim of thwarting attacks by an attacker, or at least making it more difficult for an attacker to be successful with his attacks), such as any one of the above-mentioned white-box obfuscation techniques and/or any one of the above-mentioned node-locking techniques and/or any one of the above-mentioned software watermarking techniques and/or any one of the above-mentioned diversity techniques.

In embodiments of the invention, the software protection tool 252 may apply one or more of the above-mentioned software protection techniques to the initial item of software 220 to generate the protected item of software 260.

There are numerous ways in which the above-mentioned software protection may be implemented within the protected item of software 260, i.e. there are numerous ways in which the above-mentioned software protection techniques may be applied to the initial item of software to obtain the protected item of software 260. In particular, to generate the protected item of software 260 from the initial item of software 220, the software protection tool 252 may modify one or more portions of code within the initial item of software 220 and/or may add or introduce one or more new portions of code into the initial item of software 220. The actual way in which these modifications are made or the actual way in which the new portions of code are written can, of course, vary—there are, after all, numerous ways of writing software to achieve the same functionality. However, it has been inventively realized that the following problems exist with current methods of implementing software protection techniques:

(a) The application of some software protection techniques (or at least parts of some software protection techniques) is a manual process. Hence, the software protection applied will be specific to the initial item of software 220 and its idiosyncrasies. This means that the quality or strength of the protection will depend on the skills of the security team that is manually implementing or applying the software protection. This may then have an adverse impact on subsequent automated steps of the application of the software protection techniques (for example, in terms of efficiency and/or size and/or security of the resulting code of the protected item of software 260).

(b) The application of some software protection techniques (such as the white-box obfuscation techniques) often results in very obscure code. Obscurity does not necessarily mean security, since it complicates the security audit task and may result in undetected weaknesses. It would be desirable to be able to eliminate (or at least reduce the likelihood of) such undetected weaknesses and make the task of security auditing easier. Additionally, if a weakness is subsequently detected, then the inherent obscurity means that the ability to provide a software update to fix the detected weakness is made more difficult, slow and costly.

(c) The initial item of software 220 often involves the use of mixed arithmetic and logic mathematics (such as $y=(a \times x) \oplus b$). This invariably makes the application of some software protection techniques to the initial item of software 220 more difficult and reduces the options for automating the application of some software protection techniques.

(d) Some software protection techniques apply to wordwise data elements (e.g. they always operate on data represented as 32-bit words). This represents a risk, since it makes it easier for an attacker to trace critical assets and/or detect processing patterns.

As shall be become evident, embodiments of the invention address one or more of these problems.

3—Use of a Vector Space Over a Finite Ring

In embodiments of the invention, the software protection tool 252 applies one or more software protection techniques to the initial item of software 220 so that the resulting protected item of software 260 implements the data processing (i.e. the functionality provided by the initial item of software 220, as described above) at least in part as one or more linear algebra operations over a finite ring.

In particular, the protected item of software 260 implements the data processing at least in part as one or more linear algebra operations over a finite ring instead of implementing that data processing merely using arithmetic operations over a finite ring or logic operations over a finite ring. For example, initial items of software 220 are normally written so that the program variables and data are, effectively, elements of (or are represented as elements of) the finite ring $\mathcal{F} = \{\mathbb{N}/2^n\mathbb{N}\}$, i.e. the ring of n-bit numbers with addition and multiplication modulo positive integer n. The initial items of software 220 then implement their functionality using arithmetic operations and logic operations that operate on data (or parameters or variables) that are elements of (or that are represented as elements of) this finite ring $\mathcal{F}$. Here, n is often 32 or 64 (for 32-bit or 64-bit words and 32-bit or 64-bit processors). In contrast, in embodiments of the invention, the resulting protected item of software 260 implements the data processing at least in part as one or more linear algebra operations over a finite ring. Here, a "linear algebra" operation is an operation or function on one or more elements of a vector space $\mathcal{V}$.

As shall become apparent from the following, elements of the finite ring $\mathcal{F}$ can be represented as corresponding elements of a vector space $\mathcal{V}$ over the finite ring $\mathcal{F}$ and vice versa. Here, the vector space $\mathcal{V}$ is a vector space whose elements are vectors, where the components or elements of each vector are elements of the finite ring $\mathcal{F}$. Similarly, arithmetic operations over the finite ring $\mathcal{F}$ and logic operations over this finite ring $\mathcal{F}$ can be implemented as corresponding respective linear algebra operations for the vector space $\mathcal{V}$, where each linear algebra operation operates on respective input data represented as one or more elements of the vector space $\mathcal{V}$ to produce corresponding output data. Thus, in embodiments of the invention, the software protection tool 252 implements one or more of the software protection techniques, at least in part, by adding code into the initial item of software 220 and/or modifying existing code of the initial item of software 220 so that the added code and/or the modified code comprises (or is implemented as) one or more linear algebra operations for the vector space $\mathcal{V}$ (and operates on elements of the vector space $\mathcal{V}$). The end result is that the initial item of software 220 still has the same software protection techniques applied to it—however, those software protection techniques are applied to, or implemented within, the initial item of software 220 in a different manner from how they have been previously applied to, or implemented within, initial items of software 220 (in that the added code and/or the modification(s) made to existing code comprises one or more linear algebra operations for the vector space V that operate on elements of the vector space $\mathcal{V}$).

In the following the finite ring shall be the quotient ring $\mathcal{F} = \{\mathbb{N}/2^n\mathbb{N}\}$ as discussed above, and the vector space $\mathcal{V}$ shall be the vector space $\mathcal{V} = \mathcal{F}^n$ (i.e. the elements of the vector space $\mathcal{V}$ are vectors with n elements/components that are themselves elements of the finite ring $\mathcal{F}$). It will be appreciated, however, that embodiments of the invention apply equally to different finite rings $\mathcal{F}$ and vector spaces $\mathcal{V}$.

3.1—Mapping from $\mathcal{V}$ to $\mathcal{F}$

Define the function $\|\cdot\|_b: \mathcal{V} \to \mathcal{F}$ as follows:

$$\forall u \in \mathcal{V}, \|u\|_b = \sum_{i=0}^{n-1} u_i \times 2^i$$

Then the function $\|\cdot\|_b$ provide a means of mapping any element u of the vector space $\mathcal{V}$ to an element of the finite ring $\mathcal{F}$. Thus, an expression (or formula or operation) defined with respect to one or more elements of the vector space $\mathcal{V}$ may be mapped to a corresponding expression (or formula or operation) operating on one or more corresponding elements of the finite ring $\mathcal{F}$.

The function $\|\cdot\|_b$ has the property that $\forall \alpha \in \mathcal{F}$, $u \in \mathcal{V}$, $\alpha \times \|\cdot\|_b = \|\cdot\|\alpha \cdot u\|_b$.

It will be appreciated that there are other ways in which a function that maps (or associates) elements of the vector space $\mathcal{V}$ to corresponding elements of the finite ring $\mathcal{V}$ may be defined, and that embodiments of the invention are not limited to the example function $\|\cdot\|_b$ given above.

3.2—Mapping from $\mathcal{F}$ to $\mathcal{V}$

Let the function $\alpha: \mathcal{F} \to \mathcal{V}$ be a function that maps (or associates) elements of the finite ring $\mathcal{F}$ to corresponding elements of the vector space $\mathcal{V}$. There are many ways in which the function $\alpha$ may be defined, and it will be appreciated that embodiments of the invention are not limited to the examples given below.

One example of the function $\alpha$ is the function $\alpha_0: \mathcal{F} \to \mathcal{V}$ defined by:

$$\forall a \in \mathcal{F}, \alpha_0(a) = \begin{pmatrix} a \\ 0 \\ \vdots \\ 0 \end{pmatrix}$$

Another example of the function $\alpha$ is the function $\alpha_b: \mathcal{F} \to \mathcal{V}$ defined as follows. If $\alpha \in \mathcal{F}$ and the binary representation of $\alpha$ is $(b_{n-1} b_{n-2} \ldots b_0)$, $b_i \in \{0,1\}$, then $$\alpha_b(a) = \begin{pmatrix} b_0 \\ \vdots \\ b_{n-2} \\ b_{n-1} \end{pmatrix}$$

Note that $\forall \alpha \in \mathcal{F}$, $\|\alpha_b(a)\|_b = \alpha$.

3.3—Normalized Form of an Element of $\mathcal{V}$

Define a function $\beta: \mathcal{V} \to \mathcal{V}$ as follow:

$$\forall u \in \mathcal{V}, \beta(u) = \alpha_b(\|u\|_b)$$

The element $\beta(u)$ of the vector space $\mathcal{V}$ may be viewed as a "normalized" form of element u of the vector space $\mathcal{V}$. The use of the function $\beta$ shall be described shortly.

Note that for any element p of the ring $\mathcal{F}$, if $u = \alpha_b(p)$ then $\beta(u) = \alpha_b(\|\alpha_b(p)\|_b) = \alpha_b(p) = u$.

3.4—Logical Multiplication

Define the function $x_l$: $\mathcal{V} \times \mathcal{V} \to \mathcal{V}$ as follows:

$$\forall u, v \in \mathcal{V},$$

$$u \times_1 v = M(u) \times v = \begin{pmatrix} u_0 \times v_0 \\ \vdots \\ u_{n-2} \times v_{n-2} \\ u_{n-1} \times v_{n-1} \end{pmatrix}$$

where $$u = \begin{pmatrix} u_0 \\ \vdots \\ u_{n-2} \\ u_{n-1} \end{pmatrix},$$

$$v = \begin{pmatrix} v_0 \\ \vdots \\ v_{n-2} \\ v_{n-1} \end{pmatrix}$$

and $M(u)$ denotes the diagonal matrix with elements $m_{ij}$ defined by $m_{ii}=u_i$ for $i=0, \ldots, n-1$ and $m_{ij}=0$ for $i \ne j$.

The use of the function $x_1$ shall be described shortly.

3.5—Addition of Elements of $\mathcal{F}$

Note that, $\forall u, v \in \mathcal{V}$, $\|u+v\|_b = \|u\|_b + \|v\|_b$

Therefore, if two elements p and q in $\mathcal{F}$ are represented in $\mathcal{V}$ as $u = \alpha_b(p)$ and $v = \alpha_b(q)$, then the sum $p+q$ of p and q in $\mathcal{F}$ is equivalent to the sum $u+v$ in $\mathcal{V}$. This because mapping $u+v$ from $\mathcal{V}$ back to $\mathcal{F}$, via the mapping $\|\cdot\|_b$, yields $\|u+v\|_b = \|u\|_b + \|v\|_b = \|\alpha_b(p)\|_b + \|\alpha_b\|_b = p+q$.

3.6—Multiplication of Elements of $\mathcal{F}$

Define the function $x_b$: $\mathcal{V} \times \mathcal{V} \to \mathcal{V}$ as follow:

$$\forall u, v \in \mathcal{V},$$

$$u \times_b v = \begin{pmatrix} r_0 \\ \vdots \\ r_{n-2} \\ r_{n-1} \end{pmatrix}$$

where $$u = \begin{pmatrix} u_0 \\ \vdots \\ u_{n-2} \\ u_{n-1} \end{pmatrix},$$

$$v = \begin{pmatrix} v_0 \\ \vdots \\ v_{n-2} \\ v_{n-1} \end{pmatrix}$$

and $r_k = \Sigma_{i+j=k} U_i \times v_j$.

Note that, $\forall u, v \in \mathcal{V}$, $\|u \times_b v\|_b \times \|u\|_b = \|u\|_b \times \|v\|_b$ Therefore, if two elements p and q in $\mathcal{F}$ are represented in $\mathcal{V}$ as $u = \alpha_b(p)$ and $v = \alpha_b(q)$, then the product $p \times q$ of p and q in $\mathcal{F}$ is equivalent to the product $u \times_b v$ in $\mathcal{V}$. This because mapping $u \times_b v$ from $\mathcal{V}$ back to $\mathcal{F}$, via the mapping $\|\cdot\|_b$, yields $\|u \times_b v\|_b = \|u\|_b \times \|v\|_b = \|\alpha_b(p)\|_b \times \|\alpha_b(q)\|_b = p \times q$.

3.7—Polynomial Transform of Elements of $\mathcal{F}$

Consider a quadratic transform T defined by coefficients a, b, c $\in \mathcal{F}$ as follows: $\forall 60 \ \chi \in \mathcal{F}$, $(\chi)_T = a \times \chi^2 + b \times \chi + c$.

If element $\chi$ in $\mathcal{F}$ is represented in $\mathcal{V}$ as $w = \alpha_b(\chi)$, then we need to determine which element u in $\mathcal{V}$ is equivalent the transformed element $(\chi)_T$ in $\mathcal{F}$, i.e. an element u in $\mathcal{V}$ for which $\|u\|_b = (\chi)_T$.

Set $u = a \cdot \alpha_b(x) \times_b \alpha_b(x) + b \cdot \alpha_b(x) + \alpha_0(c)$.

Then $$u = a \cdot \alpha_b(x) \times_b \alpha_b(x) + b \cdot \alpha_b(x) + \alpha_0(c) \Rightarrow u =$$
$$a \cdot \alpha_b(x^2) + b \cdot \alpha_b(x) + \alpha_0(c) \Rightarrow u = a \cdot v + b \cdot w + \alpha_0(c)$$

where $$v = \alpha_b(x^2)$$

and $$w = \alpha_b(x) \Rightarrow u = \begin{pmatrix} a \times v_0 + b \times w_0 + c \\ a \times v_1 + b \times w_1 \\ \vdots \\ a \times v_{n-1} + b \times w_{n-1} \end{pmatrix}$$

where $$w = \begin{pmatrix} w_0 \\ \vdots \\ w_{n-2} \\ w_{n-1} \end{pmatrix},$$

$$v = \begin{pmatrix} v_0 \\ \vdots \\ v_{n-2} \\ v_{n-1} \end{pmatrix} \Rightarrow \|u\|_b = (x)_T$$

Therefore, if element $\chi$ in $\mathcal{F}$ is represented in $\mathcal{V}$ as $w = \alpha_b(\chi)$, then the transformed element $(\chi)_T$ in $\mathcal{F}$ is equivalent to the element $u = a \cdot w \times_b w + b \cdot w + \alpha_0(c)$ in $\mathcal{V}$. This because mapping u from $\mathcal{F}$ back to $\mathcal{F}$, via the mapping $\|\cdot\|_b$, yields $\|u\|_b = (\chi)_T$.

We also have: $\forall u \in \mathcal{V}$, $\|(u)_T\|_b = (\|u\|_b)_T$

It will be appreciated that the above applies analogously to any polynomial transformation for arbitrary order. In particular, consider the general polynomial transform T defined by coefficients $\alpha_0, \alpha_1, \ldots, \alpha_m \in \mathcal{F}$ as follows: $\forall \chi \in \mathcal{F}$, $(\chi)_T = \Sigma_{i=0}^m \alpha_i \chi^i$. Then if element $\chi$ in $\mathcal{F}$ is represented in $\mathcal{V}$ as $w = \alpha_b(\chi)$, then the transformed element $(\chi)_T$ in $\mathcal{F}$ is equivalent to the element $u = \alpha_0(\alpha_0) + \alpha_1 \cdot w + \alpha_2 \cdot w \times_b w + \alpha_3 \cdot w \times_b w \times_b w + \ldots$ in $\mathcal{V}$. This because mapping u from $\mathcal{V}$ back to $\mathcal{F}$, via the mapping $\|\cdot\|_b$, yields $\|u\|_b = (\chi)_T$.

3.8—Logical AND of Elements of $\mathcal{F}$

Define the function, or operator, $\wedge$: $\mathcal{V} \times \mathcal{V} \to \mathcal{V}$ as follows:

$$\forall u, v \in \mathcal{V},$$

$$u \wedge v = u - [\alpha_b(2^n - 1) - v] \times_1 \beta(u) = u - \begin{pmatrix} (1-v_0) \times u'_0 \\ (1-v_1) \times u'_1 \\ \vdots \\ (1-v_n) \times u'_n \end{pmatrix}$$

$$\text{where } v = \begin{pmatrix} v_0 \\ \vdots \\ v_{n-2} \\ v_{n-1} \end{pmatrix} \text{ and } u' = \beta(u) = \begin{pmatrix} u'_0 \\ \vdots \\ u'_{n-2} \\ u'_{n-1} \end{pmatrix}.$$

Then $\forall\, u, v \in \mathcal{V}$, $\|u \wedge v\|_b = \|u\|_b \wedge \|v\|_b$. Therefore, if two elements p and q in $\mathcal{F}$ are represented in $\mathcal{V}$ as $u=\alpha_b(p)$ and $v=\alpha_b(q)$, then the logical (bitwise) AND $p \wedge q$ of p and q in $\mathcal{F}$ is equivalent to $u \wedge v$ in $\mathcal{V}$. This because mapping $u \wedge v$ from $\mathcal{V}$ back to $\mathcal{F}$, via the mapping $\|\cdot\|_b$, yields $\|u \wedge v\|_b = \|u\|_b \wedge \|v\|_b = \|\alpha_b(P)\|_b \wedge \|\alpha_b\|_b = p \wedge 1$.

3.9—Logical XOR of Elements of $\mathcal{F}$

Define the function, or operator, $\oplus: \mathcal{V} \times \mathcal{V} \to \mathcal{V}$ as follows:

$$\forall u, v \in \mathcal{V}, u \oplus v = u + v - 2(u \wedge v)$$

Then $$\forall\, u, v \in \mathcal{V}, \|u \oplus v\|_b = \|u + v - 2 \cdot (u \wedge v)\|_b$$
$$= \|u\|_b + \|v\|_b - 2 \times \|u \wedge v\|_b.$$

Therefore, if two elements p and q in $\mathcal{F}$ are represented in $\mathcal{V}$ as $u=\alpha_b(p)$ and $v=\alpha_b(q)$, then the logical (bitwise) XOR $p \oplus q$ of p and q in $\mathcal{F}$ is equivalent to $u \oplus v$ in $\mathcal{V}$. This because mapping $u \oplus v$ from $\mathcal{V}$ back to $\mathcal{F}$, via the mapping $\|\cdot\|_b$, yields:

$$\|u \oplus v\|_b = \|u + v - 2 \cdot (u \wedge v)\|_b$$
$$= \|u\|_b + \|v\|_b - 2 \times \|u \wedge v\|_b$$
$$= \|\alpha_b(p)\|_b + \|\alpha_b(q)\|_b - 2 \times \|u \wedge v\|_b$$
$$= p + q - 2 \times p \wedge q$$
$$= p \oplus q.$$

3.10—Other Logical Operators of Elements of $\mathcal{F}$

As all logical operators on elements of $\mathcal{F}$ can be expressed in terms of the logical (bitwise) AND and XOR operators on elements of $\mathcal{F}$, and as the logical (bitwise) AND and XOR operators on elements of $\mathcal{F}$ have corresponding linear algebra operator in $\mathcal{V}$, all other logical operators on elements of $\mathcal{F}$ can be expressed in terms of the above-mentioned linear algebra operators $\wedge: \mathcal{V} \times \mathcal{V} \to \mathcal{V}$ and $\oplus: \mathcal{V} \times \mathcal{V} \to \mathcal{V}$.

3.11—Shift Operation of Elements of $\mathcal{F}$

Define the function $s_R: \mathcal{V} \times \{1, \ldots, n-1\} \to \mathcal{V}$ as follow:

$$\forall u \in \mathcal{V}, k \in \{1, \ldots, n-1\},$$

$$s_R(u, k) = S_R(k) \times \beta(u) = S_R(k) \times u' = \begin{pmatrix} u'_k \\ \vdots \\ u'_{n-1} \\ 0 \\ \vdots \\ 0 \end{pmatrix}$$

where $$u' = \beta(u) = \begin{pmatrix} u'_0 \\ \vdots \\ u'_{n-2} \\ u'_{n-1} \end{pmatrix}$$

and where $S_R(k)$ is the n×n matrix defined by $$S_R(k) = \begin{cases} m_{i-k,i} = 1, & k \leq i < n \\ 0 & \text{otherwise} \end{cases}$$

Suppose that an element x in $\mathcal{F}$ is represented in $\mathcal{V}$ as $u=\alpha_b(x)$, and suppose that the binary representation of x is $(u_{n-1}u_{n-2} \ldots u_0)$, $u_i \in \{0,1\}$ so that $$\alpha_b(x) = \begin{pmatrix} u_0 \\ \vdots \\ u_{n-2} \\ u_{n-1} \end{pmatrix},$$

then a right shift, in $\mathcal{F}$, by k places results in the element $X_{R,k}$ in $\mathcal{F}$ whose binary representation is $(000u_{n-1}u_{n-2} \ldots u_k)$. The element $X_{R,k}$ in $\mathcal{F}$ is equivalent to the element $s_R(u, k)$ in $\mathcal{V}$. This because mapping $s_R(u, k)$ from $\mathcal{V}$ back to $\mathcal{F}$, via the mapping $\|\cdot\|_b$, yields $$\|s_R(u, k)\|_b = \left\| \begin{pmatrix} u'_k \\ \vdots \\ u'_{n-1} \\ 0 \\ \vdots \\ 0 \end{pmatrix} \right\|_b = \left\| \begin{pmatrix} u_k \\ \vdots \\ u_{n-1} \\ 0 \\ \vdots \\ 0 \end{pmatrix} \right\|_b$$

because $u=\alpha_b(x)$ so that $\beta(u)=u$. Thus, $\|s_R(u, k)\|_b = X_{R,k}$.

Similarly, define the function $s_L: \mathcal{V} \times \{1, \ldots, n-1\} \to \mathcal{V}$ as follow:

$$\forall u \in \mathcal{V}, k \in \{1, \ldots, n-1\},$$

$$s_L(u, k) = S_L(k) \times \beta(u) = S_L(k) \times u' = \begin{pmatrix} 0 \\ \vdots \\ 0 \\ u'_0 \\ \vdots \\ u'_{n-k-1} \end{pmatrix}$$

where $$u' = \beta(u) = \begin{pmatrix} u'_0 \\ \vdots \\ u'_{n-2} \\ u'_{n-1} \end{pmatrix}$$

and where $S_L(k)$ is the n×n matrix defined by $$S_L(k) = \begin{cases} m_{i+k,i} = 1, & 0 \leq i < n-k \\ 0 & \text{otherwise} \end{cases}$$

Suppose that an element x in $\mathcal{F}$ is represented in $\mathcal{V}$ as $u=\alpha_b(x)$, and suppose that the binary representation of x is $(u_{n-1}u_{n-2} \ldots u_0)$, $u_i \in \{0,1\}$ so that $$\alpha_b(x) = \begin{pmatrix} u_0 \\ \vdots \\ u_{n-2} \\ u_{n-1} \end{pmatrix},$$

then a left shift, in $\mathcal{F}$, by k places results in the element $x_{L,k}$ in $\mathcal{F}$ whose binary representation is $(u_{n-k-1}u_{n-k-2} \ldots u_0 000 \ldots 0)$. The element $x_{L,k}$ in $\mathcal{F}$ is equivalent to the element $s_L(u, k)$ in $\mathcal{V}$. This because mapping $s_L(u, k)$ from $\mathcal{V}$ back to $\mathcal{F}$, via the mapping $\|\cdot\|_b$, yields $$\|s_L(u, k)\|_b = \left\| \begin{pmatrix} 0 \\ \vdots \\ 0 \\ u'_0 \\ \vdots \\ u'_{n-k-1} \end{pmatrix} \right\|_b = \left\| \begin{pmatrix} 0 \\ \vdots \\ 0 \\ u_0 \\ \vdots \\ u_{n-k-1} \end{pmatrix} \right\|_b$$

because $u=\alpha_b(\chi)$ so that $\beta(u)=u$. Thus, $\|s_L(u, k)\|_b = \chi_{L,k}$.

3.12—Other Functions or Operators of $\mathcal{F}$

The example functions and operators above show that, for a function F1 that (a) operates on one or more operands (or parameters) $x_1 \ldots x_s$ that are elements of the ring $\mathcal{F}$ to (b) generate one or more results $y_1 \ldots y_t$ that are elements of the ring $\mathcal{F}$, there is an equivalent function or operator F2 that (a) operates on one or more operands (or parameters) that are elements of the vector space $\mathcal{V}$ and that correspond to $x_1 \ldots x_s$ according to a mapping between $\mathcal{V}$ and $\mathcal{F}$ and (b) generates one or more results that correspond to $y_1 \ldots y_t$ according to the mapping between $\mathcal{V}$ and $\mathcal{F}$. Whilst a number of example functions and operators in $\mathcal{F}$ and their equivalent functions and operators in $\mathcal{V}$ have been described above, it will be appreciated that more functions and operators in $\mathcal{F}$, and their equivalent functions and operators in $\mathcal{V}$, can be defined and determined based on these examples. Additionally, in a similar manner to the discussions above, the skilled person would be able to determine, for any function or operator in $\mathcal{F}$, its equivalent function or operator in $\mathcal{V}$.

Consequently, it will be appreciated that the software protection tool 252 may be arranged to implement one or more of the software protection techniques, at least in part, by adding code into the initial item of software 220 and/or modifying existing code of the initial item of software 220 so that the added code and/or the modified code comprises (or is implemented as) one or more linear algebra operations for the vector space $\mathcal{V}$ (and operates on elements of the vector space $\mathcal{V}$), this being instead of adding code and/or modifying code using one or more arithmetic and/or logic operations over the finite ring $\mathcal{F}$. For example, using the above equivalences, existing techniques that implement one or more of the software protection techniques, but that do so merely using arithmetic and/or logic operations over the ring $\mathcal{F}$, may be converted into techniques that implement those one or more software protection techniques in a functionally equivalent manner, but that do so using linear algebra operations for the vector space $\mathcal{V}$.

In some embodiments, the software protection system 250 comprises a database 254. The database 254 comprises one or more portions of software or code which may be used by the software protection tool 252 when generating the protected item of software 260. For example, the database 254 may comprise one or more portions of code for implementing a polynomial transformation in the vector space $\mathcal{V}$, as set out in section 3.7 above. In this way, a set of reference/template code portions may be developed and maintained for future use by the software protection 252 and/or an operator of the software protection 252. As shown in FIG. 2, one or more of these portions of code in the database 254 may be written or developed with the software generation system 210.

There are numerous advantages and benefits provided by adopting the approach of using linear algebra operations over the finite field $\mathcal{F}$, instead of using arithmetic and/or logic operations over the finite field $\mathcal{F}$, to implement the software protection techniques. For example:

The software protection techniques are implemented using a reduced set of mathematical operations (namely linear algebra operations over the finite field $\mathcal{F}$), thereby establishing a standard that helps improve security auditing. In particular, the reach of a security audit can be extended to the design of the software protection techniques. Communication and understanding between the engineering teams (who write the initial items of software 220 and/or implement the software protection techniques using the software protection tool 252) and the security audit teams may be improved due to a better common understanding of the protection framework based on this reduced set of mathematical operations.

By expressing arithmetic and logic operation as linear algebra operations for the vector space $\mathcal{V}$, the above-mentioned difficulty of protecting initial items of software 220 that comprise mixed arithmetic/logic mathematics is removed. This then enables more automation of the software protection process.

Analysis of weaknesses and security breaches, and creating solutions for such weaknesses and breaches, is facilitated since the software protection techniques are implemented using a reduced set of mathematical operations.

4—an Example

An example of the above-mentioned techniques is provided below. However, it will be appreciated that this is purely one example, and that embodiments of the invention can be applied equally to other software protection techniques and in other ways.

Suppose the initial item of software 220 is arranged to generate a control word CW (i.e. a cryptographic key for decrypting encrypted content). The initial item of software 220 may, therefore, compute CW according to the formula or function CW=M⊕K, where M is a "mask" and K is a key, in particular both M and K are 32-bit unsigned words.

The ring $\mathcal{F}$ is $\mathcal{F} = \{\mathbb{N}/2^{32}\mathbb{N}\}$ and the vector space $\mathcal{V}$ is $\mathcal{V} = \mathcal{F}^{32}$.

Both M and K are elements of $\mathcal{F}$, so let $m = \alpha_b(M)$ and $k = \alpha_b(K)$ be their equivalents in $\mathcal{V}$.

One well-known technique for protecting a function that operates on one or more software variables involves applying respective linear transformations to those variables and then performing a transformed version of the function on those transformed variables—see, for example, "*White-Box Cryptography and an AES Implementation*", S. Chow et al, Selected Areas in Cryptography, 9$^{th}$ Annual International Workshop, SAC 2002, Lecture Notes in Computer Science 2595 (2003), p250-270 and "*A White-box DES Implementation for DRM Applications*", S. Chow et al, Digital Rights Management, ACM CCS-9 Workshop, DRM 2002, Lecture Notes in Computer Science 2696 (2003), p1-15. The result of performing the transformed version of the function on the transformed variables can, itself, be transformed so as to then obtain the correct result from the function. This yields the correct result, but the processing will have been performed on transformed variables without ever revealing the true (untransformed) values of those variables, thereby hiding those values from an attacker.

Applying this to the present example, then, define transforms $T_{a,b}: \mathcal{V} \to \mathcal{V}$ and $R_{a,b}: \mathcal{V} \to \mathcal{V}$ as follows for a, b ∈ $\mathcal{V}: \forall \mathcal{V} \in \mathcal{V}$, $T_{a,b}(\mathcal{V}) = a x_1 \mathcal{V} + b$ and $\forall \mathcal{V} \in \mathcal{V}$, $R_{a,b}(\mathcal{V}) = (\mathcal{V} - b) x_1 a^{inv}$, where if $$a = \begin{pmatrix} a_0 \\ \vdots \\ a_{n-2} \\ a_{n-1} \end{pmatrix} \text{ then } a^{inv} = \begin{pmatrix} a_0^{-1} \\ \vdots \\ a_{n-2}^{-1} \\ a_{n-1}^{-1} \end{pmatrix}.$$

Thus, $R_{a,b}$ is the inverse of the function $T_{a,b}$.

Similarly, define transforms $T_{c,d}: \mathcal{V} \to \mathcal{V}$ and $R_{c,d}: \mathcal{V} \to \mathcal{V}$ as follows for c, d ∈ $\mathcal{V}: \forall \mathcal{V} \in \mathcal{V}$, $T_{c,d}(\chi) = c x_1 \mathcal{V} + d$ and $\forall \mathcal{V} \in \mathcal{V}$, $R_{c,d}(\chi) = (\chi - d) x_1 c^{inv}$, where if $$c = \begin{pmatrix} c_0 \\ \vdots \\ c_{n-2} \\ c_{n-1} \end{pmatrix} \text{ then } c^{inv} = \begin{pmatrix} c_0^{-1} \\ \vdots \\ c_{n-2}^{-1} \\ c_{n-1}^{-1} \end{pmatrix}.$$

Thus, $R_{c,d}$ is the inverse of the function $T_{c,d}$. Then, transformed versions of $m = \alpha_b(M)$ and $k = \alpha_b(K)$ can be obtained as follows: $m' = T_{a,b}(m)$ and $k' = T_{c,d}(k)$.

As discussed above, if two elements p and q in $\mathcal{F}$ are represented in $\mathcal{F}$ as $u = \alpha_b(p)$ and $\mathcal{V} = \alpha_b(q)$, then the logical (bitwise) XOR p⊕q of p and q in $\mathcal{F}$ is equivalent to u⊕v in $\mathcal{V}$. Thus, the logical (bitwise) XOR CW=M⊕K of M and K in $\mathcal{F}$ is equivalent to cw=m⊕k in $\mathcal{V}$.

Then:

$$cw = m \oplus k$$

$$cw = R_{a,b}(m') \oplus R_{c,d}(k')$$

$$cw = R_{a,b}(m') + R_{c,d}(k') - 2 \times \{R_{a,b}(m') \wedge R_{c,d}(k')\}$$

$$cw = (m'-b) \times_1 a^{inv} + (k'-d) \times_1 c^{inv} - 2 \times \{(m'-b) \times_1 a^{inv} - (I - (k'-d) \times_1 c^{inv}) \times_1 m\}$$

where $I = \alpha_b(2^{32}-1)$.

One can thus express cw as cw=A+B+C where $$A = a^{inv} \times_1 b - 2 \times c^{inv} \times_1 k' \times_1 m$$

$$B = 2 \times c^{inv} \times_1 d \times_1 m + 2 \times m + 2 \times m - a^{inv} \times_1 m'$$

$$C = c^{inv} \times_1 k' - c^{inv} \times_1 d$$

Thus, the vectors A, B and C may be computed using linear algebra operations. A content provider, or a conditional access system, may then generate the vectors A, B and C as above and then communicate these vectors to a user system 280. The protected item of software 260 executing on the user system 280, instead of being arranged to receive M and K from the content provider or conditional access system and to calculate CW=M⊕K as in the initial item of software 220, is arranged to receive the vectors A, B and C from the content provider or conditional access system and to calculate CW=‖cw‖$_b$=$\Sigma_{i=0}^{31}(A_i+B_i+C_i) \times 2^i$ Thus, the above-mentioned software protected technique has been applied to the initial item of software 220 to generate a protected item of software 260, where the software protected technique is implemented using linear algebra operations for υ.

In the above example the choice of splitting cw into the particular vectors A, B and C is useful because: B updates the mask M on the user system 280, C contains the content dependent key K, and A then "glues" B and C together to enable user system 280 to obtain CW as set out above. The user system 280 does not need to "de-transform" explicitly vectors A, B and C to explicitly calculate the mask M and the key K in order to compute CW, thus an attacker observing the processing (for example in a debugger) is not able to determine the values of the mask M and the key K even thought the mask M and the key K are being used.

It will be appreciated, however, that there are other ways in which cw may be split into two or more vectors, and that embodiments of the invention are not limited to splitting cw into the particular vectors A, B and C as set out above.

5—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps as described above may each be implemented by corresponding respective modules; multiple method steps may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), a optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method, implemented by one or more computer hardware processors, for protecting an item of software, the method comprising:

receiving, from a computer hardware device, said item of software, said item of software including operations arranged to perform data processing, based on one or more items of data represented as a respective element of a finite field, when executed by a computer processor;

applying one or more software protection techniques to said item of software to create modifications to said item of software and thereby generate a protected item of software, wherein said modifications cause said protected item of software, when executed by a computer processor, to implement said data processing at least in part as one or more linear algebra operations for a vector space over a finite ring, the vector space comprising vectors having a plurality of components, each component being an element of the finite field, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is a positive integer; and storing said protected item of software on a non-transient computer storage device.

2. The method of claim 1, wherein said data processing comprises an arithmetic operation over the finite ring, and wherein applying said one or more software protection techniques to said item of software comprises implementing said arithmetic operation in said protected item of software using one or more linear algebra operations over said finite ring.

3. The method of claim 1, wherein said data processing comprises a logic operation over the finite ring, and wherein applying said one or more software protection techniques to said item of software comprises implementing said logic operation in said protected item of software using one or more linear algebra operations over said finite ring.

4. The method of claim 1, wherein said data processing comprises at least one of:
   (a) a decision based, at least in part, on at least one of said one or more items of data;
   (b) a security-related function;
   (c) an access-control function;
   (d) a cryptographic function; and
   (e) a rights-management function.

5. The method of claim 1, wherein said one or more software protection techniques comprise one or more of:
   (i) white-box protection techniques;
   (ii) node-locking techniques;
   (iii) data flow obfuscation; and
   (iv) control flow obfuscation.

6. A method of performing data processing on one or more items of data, wherein said data processing comprises at least one of: (a) a decision based, at least in part, on at least one of said one or more items of data; (b) a security-related function; (c) an access-control function; (d) a cryptographic function; and (e) a rights-management function; wherein the method comprises:

executing a protected item of software that implements said data processing at least in part as one or more linear algebra operations for a vector space over a finite ring, the vector space comprising vectors having a plurality of components, each component being an element of the finite ring, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is positive integer.

7. The method of claim 6, wherein said data processing comprises an arithmetic operation over the finite ring, and wherein said protected item of software implements said arithmetic operation using one or more linear algebra operations over said finite ring.

8. The method of claim 6, wherein said data processing comprises a logic operation over the finite ring, and wherein said protected item of software implements said logic operation using one or more linear algebra operations over said finite ring.

9. An apparatus comprising a processor arranged to carry out a method of protecting an item of software, the method comprising:
receiving, from a computer hardware device, said item of software, said item of software including operations arranged to perform data processing, based on one or more items of data represented as a respective element of a finite field, when executed by a computer processor;
applying one or more software protection techniques to said item of software to create modifications to said item of software and thereby generate a protected item of software, wherein said modifications cause said protected item of software to implement said data processing at least in part as one or more linear algebra operations for a vector space over a finite ring, the vector space comprising vectors having a plurality of components, each component being an element of the finite field, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is a positive integer; and
storing said protected item of software on a non-transient computer storage device.

10. An apparatus comprising a processor arranged to carry out a method of performing data processing on one or more items of data, wherein said data processing comprises at least one of: (a) a decision based, at least in part, on at least one of said one or more items of data; (b) a security-related function; (c) an access-control function; (d) a cryptographic function; and (e) a rights-management function; wherein the method comprises:
executing a protected item of software that implements said data processing at least in part as one or more linear algebra operations for a vector space over a finite ring, the vector space comprising vectors having a plurality of components, each component being an element of the finite ring, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is a positive integer.

11. A non-transitory computer-readable medium storing a computer program which, when executed by one or more processors, causes the one or more processors to carry out a method of protecting an item of software, the method comprising: receiving, from a computer hardware device, said item of software, said item of software including operations arranged to perform data processing, based on one or more items of data represented as a respective element of a finite field, when executed by a computer processor;
applying one or more software protection techniques to said item of software to create modifications to said item of software and thereby generate a protected item of software, wherein said modifications cause said protected item of software to implement said data processing at least in part as one or more linear algebra operations for a vector space over a finite ring, the vector space comprising vectors having a plurality of components, each component being an element of the finite field, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is a positive integer; and
storing said protected item of software on a non-transient computer storage device.

12. A non-transitory computer-readable medium storing a computer program which, when executed by one or more processors, causes the one or more processors to carry out a method of performing data processing on one or more items of data, wherein said data processing comprises at least one of: (a) a decision based, at least in part, on at least one of said one or more items of data; (b) a security-related function; (c) an access-control function; (d) a cryptographic function; and (e) a rights-management function; wherein the method comprises:
executing a protected item of software that implements said data processing at least in part as one or more linear algebra operations for a vector space over a finite ring, the vector space comprising vectors having a plurality of components, each component being an element of the finite ring, wherein each of said one or more linear algebra operations operates on respective input data represented as one or more vectors of the vector space to produce respective output data, wherein, for at least one of said one or more linear algebra operations, said respective input data is generated based, at least in part, on at least one of said one or more items of data represented as a respective vector of the vector space, wherein said finite ring is a ring $F=\{\mathbb{N}/2^n\mathbb{N}\}$ and said vector space is a vector space $V=F^n$, wherein n is a positive integer.

* * * * *